(12) United States Patent
Walters et al.

(10) Patent No.: US 11,080,707 B2
(45) Date of Patent: Aug. 3, 2021

(54) METHODS AND ARRANGEMENTS TO DETECT FRAUDULENT TRANSACTIONS

(71) Applicant: Capital One Services, LLC, McLean, VA (US)

(72) Inventors: Austin Grant Walters, Savoy, IL (US); Jeremy Edward Goodsitt, Champaign, IL (US); Fardin Abdi Taghi Abad, Champaign, IL (US); Reza Farivar, Champaign, IL (US); Vincent Pham, Champaign, IL (US); Mark Louis Watson, Urbana, IL (US); Anh Truong, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/112,169

(22) Filed: Aug. 24, 2018

(65) Prior Publication Data

US 2020/0065812 A1 Feb. 27, 2020

(51) Int. Cl.
*G06N 3/08* (2006.01)
*G06Q 20/40* (2012.01)

(52) U.S. Cl.
CPC ........... *G06Q 20/4016* (2013.01); *G06N 3/08* (2013.01)

(58) Field of Classification Search
CPC ............................ G06Q 20/4016; G06N 3/08
USPC ......................................................... 705/44
See application file for complete search history.

(56) References Cited

U.S. PATENT DOCUMENTS

| 7,035,855 | B1 | 4/2006 | Kilger et al. |
| 9,489,674 | B2 | 11/2016 | Faith et al. |
| 9,633,201 | B1 | 4/2017 | Katz |
| 2002/0133721 | A1 | 9/2002 | Adjaoute |
| 2003/0208439 | A1* | 11/2003 | Rast ....................... G06Q 20/04 705/38 |
| 2005/0278192 | A1 | 12/2005 | Cantini et al. |

(Continued)

OTHER PUBLICATIONS

Miller, Michael J., "AI and the Future of Work", Forward Thinking, Nov. 16, 2017, 21 pages.

(Continued)

*Primary Examiner* — Lindsay M Maguire
*Assistant Examiner* — Michael J Warden
(74) *Attorney, Agent, or Firm* — Kacvinsky Daisak Bluni PLLC

(57) ABSTRACT

Logic may detect fraudulent transactions. Logic may determine, by a neural network based on the data about a transaction, a deviation of the transaction from a range of purchases predicted for the customer, wherein the neural network is pretrained to predict purchases by the customer based on a purchase history of the customer. Logic may compare the deviation of the transaction from purchases predicted by the customer against a deviation threshold to determine whether the transaction is within the range of purchases predicted by the neural network. Logic may generate a notification in response to a determination that the deviation of the transaction from the range of purchases predicted exceeds a deviation threshold, the notification to identify the transaction as a potentially fraudulent transaction. Logic may train the neural network based on the transaction in response to a determination that transaction is not a fraudulent transaction.

20 Claims, 7 Drawing Sheets

(56) References Cited

U.S. PATENT DOCUMENTS

| | | | |
|---|---|---|---|
| 2007/0106582 A1* | 5/2007 | Baker | G06Q 10/067 |
| | | | 705/35 |
| 2007/0174164 A1* | 7/2007 | Biffle | G06Q 40/00 |
| | | | 705/35 |
| 2007/0204033 A1 | 8/2007 | Bookbinder et al. | |
| 2008/0109392 A1* | 5/2008 | Nandy | G06N 5/025 |
| | | | 706/47 |
| 2008/0110978 A1 | 5/2008 | Blume et al. | |
| 2009/0018940 A1* | 1/2009 | Wang | G06Q 40/00 |
| | | | 705/35 |
| 2009/0089869 A1 | 4/2009 | Varghese | |
| 2011/0112931 A1 | 5/2011 | Hu et al. | |
| 2013/0024300 A1 | 1/2013 | Choudhuri et al. | |
| 2014/0188730 A1 | 7/2014 | Murgai et al. | |
| 2015/0142713 A1* | 5/2015 | Gopinathan | G06Q 40/00 |
| | | | 706/14 |
| 2015/0262193 A1 | 9/2015 | Carvalho | |
| 2016/0078446 A1* | 3/2016 | Trostle | H04L 63/145 |
| | | | 705/75 |
| 2016/0132886 A1* | 5/2016 | Burke | G06Q 20/3224 |
| | | | 705/44 |
| 2016/0217470 A1 | 7/2016 | Gerard et al. | |
| 2016/0269908 A1 | 9/2016 | Richards et al. | |
| 2017/0083985 A1 | 3/2017 | Lacoss-Arnold et al. | |
| 2017/0085587 A1 | 3/2017 | Turgeman | |
| 2017/0339010 A1 | 11/2017 | Gerety et al. | |
| 2018/0150843 A1 | 5/2018 | Adjaoute | |
| 2018/0189806 A1 | 7/2018 | Fordyce et al. | |
| 2018/0300631 A1* | 10/2018 | Roy | G06N 3/088 |

OTHER PUBLICATIONS

Marvin, Rob., "Predictive Analytics, Big Data, and How to Make Them Work for You", PCMag India-ZiffDavis, Jul. 12, 2016, 15 pages.

Williams, Mike., "5 of the best AI platforms for business", World of Tech, Jan. 10, 2018, 16 pages.

Marvin, Rob., "Cloud TPUs: A Chip to make Every Business as Smart as Google" PCMag, Jun. 7, 2017, 7 pages.

* cited by examiner

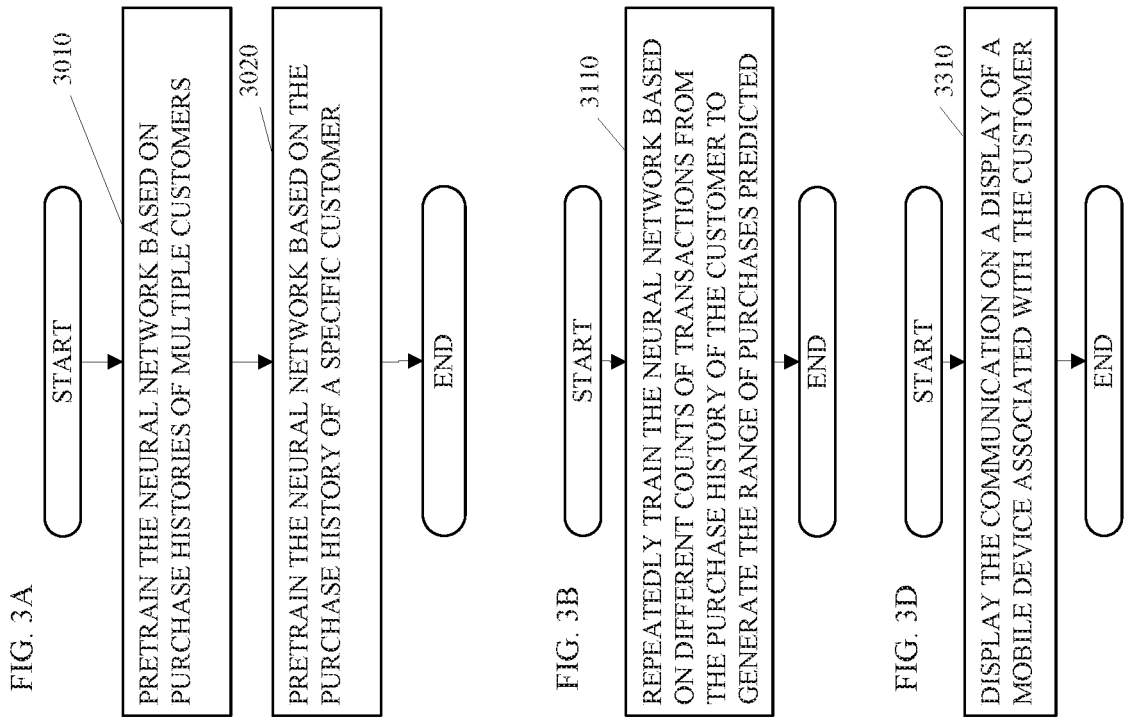

METHODS AND ARRANGEMENTS TO DETECT FRAUDULENT TRANSACTIONS

TECHNICAL FIELD

Embodiments described herein are in the field of fraud detection. More particularly, the embodiments relate to methods and arrangements to detect fraudulent customer transactions.

BACKGROUND

Although incidences of credit card fraud are limited to about 0.1% of all card transactions, they have resulted in huge financial losses as the fraudulent transactions have been large value transactions. In 1999, out of 12 billion transactions made annually, approximately 10 million—or one out of every 1200 transactions—turned out to be fraudulent. Also, 0.04% (4 out of every 10,000) of all monthly active accounts were fraudulent. Even with tremendous volume and value increase in credit card transactions since then, these proportions have stayed the same or have decreased due to sophisticated fraud detection and prevention systems. Today's fraud detection systems are designed to prevent one-twelfth of one percent of all transactions processed which still translates into billions of dollars in losses.

Typically, models to identify fraud are generated based on behavior across all customers. Fraud models essentially look at blacklisted locations, points of sales, etc., based on system wide data.

BRIEF DESCRIPTION OF THE DRAWINGS

FIGS. 3A-E depict flowcharts of embodiments to pretrain a neural network, perform fraud detection with a neural network, and notify a customer, by fraud detection logic circuitry, such as the fraud detection logic circuitry shown in FIGS. 1A-1B;

DETAILED DESCRIPTION OF EMBODIMENTS

Figure 1B:
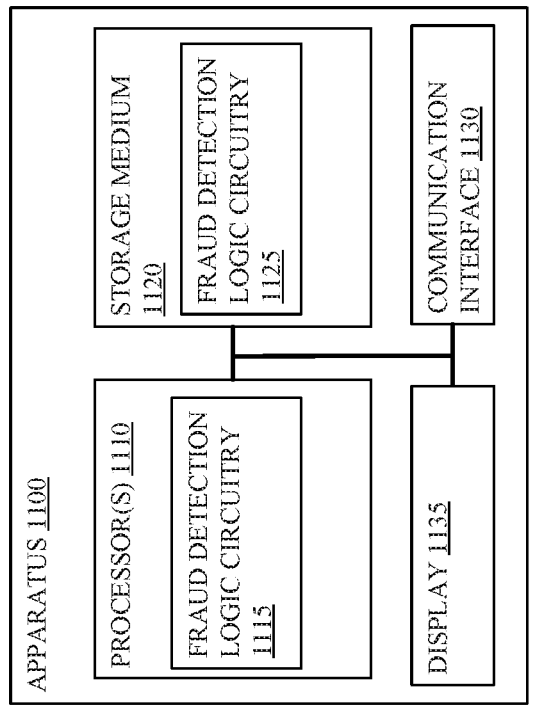
FIGS. 1A-B depict embodiments of systems including servers, networks, and customer devices to detect fraudulent transactions.

The following is a detailed description of embodiments depicted in the drawings. The detailed description covers all modifications, equivalents, and alternatives falling within the appended claims.

Contemporary fraud detection models typically blacklist certain types of transactions based on known and expected locations associated with fraud. Embodiments described herein change a fundamental concept of fraud detection by determining if a transaction is non-fraudulent. More specifically, embodiments may train neural networks to learn what a non-fraudulent transaction is and when transaction data for a fraudulent transaction is input into the neural network, the neural network may produce an error indicative of the difference between a non-fraudulent transaction and the transaction provided as the input.

Moreover, embodiments may train the neural networks based on a transaction history or purchase history for each specific customer. Many embodiments pretrain the neural network based on purchase histories of multiple customers or all customers. Thereafter, an instance of that neural network is assigned to a specific customer and retrains or continues to train based on the purchase history of that specific customer, advantageously training the neural network to recognize specific transaction patterns of that specific customer. As a result, determinations by the neural network about non-fraudulent transactions are based on predicted transactions for each customer.

In many embodiments, the neural network may pretrain on a server of, e.g., a payment instrument issuer, with function approximation, or regression analysis, or classification. Function approximation may involve time series prediction and modeling. A time series is a series of data points indexed (or listed or graphed) in time order. As discussed herein, a time series is a sequence of discrete-time transaction data related to transactions conducted at a discrete time of the day, day of the week, week of the month, month of the year, and/or the like, to classify the transaction data. Neural networks may perform time series analysis to extract meaningful statistics and other characteristics of the data such as time series forecasting to predict future values based on previously observed values.

Classification may involve pattern and sequence recognition, novelty detection, and sequential decision making. Neural networks may perform sequence learning such as sequence prediction, sequence generation, sequence recognition, and sequential decision making to classify transactions. Sequence prediction attempts to predict the next immediate element of a sequence based on all the preceding elements. Sequence generation attempts to piece together a sequence one by one the way it naturally occurs. Sequence recognition takes certain criteria and determines whether the sequence is legitimate. Sequential decision making or sequence generation through actions determine how to pick the action(s) that will lead to a goal in the future.

Note that while the neural network is trained to predict a transaction by a customer or to detect a non-fraudulent transaction, fraud detection logic circuitry may detect fraud based on a determination by the neural network of the error associated with predicting a transaction conducted by the customer or classifying the transaction conducted by the customer. In other words, the neural network learns what a non-fraudulent transaction for a customer looks like in terms of the data input to the neural network for the transaction. When data for a non-fraudulent transaction is input at the input layer of the neural network, the neural network may output an error that is small to indicate that the transaction closely matches a predicted transaction or transaction classification. On the other hand, when data for a fraudulent transaction is provided at the input layer of the neural network, the neural network may output a large error indicating that the transaction does not match a predicted transaction well or transaction classification well. Thus, the fraud detection logic circuitry may determine if a transaction is likely fraudulent by comparing the error output by the neural network to a deviation threshold. For transactions in which the output error falls below the deviation threshold, the fraudulent detection logic circuitry may consider the transaction to be non-fraudulent. For transactions in which the output error reaches or exceeds the deviation threshold, the fraudulent detection logic circuitry may consider the transaction to be fraudulent or to potentially be fraudulent. Fraudulent transactions can then be confirmed by generating a notification for the customer and causing a message or communication with the notification to transmit or to display to the customer along with a request to verify that the transaction is fraudulent or non-fraudulent.

Note that logic circuitry refers to circuitry that implements logic with discrete components and/or integrated circuits; circuitry with processing capabilities to perform logic at least partially in the form of code along with the code; circuitry with buffers, other storage media, and/or other storage capabilities to store code along with the code; and/or a combination thereof.

Many embodiments pretrain the neural network with multiple sets of transactions, each set including transaction data for a sequence or time series of transactions by a customer. In several embodiments, the neural network is initially pretrained with sets of transactions from multiple customers to train the neural network about common sequences of transactions. Some embodiments select different sets of transactions from the multiple customers to train the neural network with transaction sequences that have different counts of transactions that may begin, e.g. at different times, advantageously increasing the robustness of the neural network's ability to recognize non-fraudulent transactions. Some embodiments randomly select non-fraudulent transactions to generate a time series of transactions with which to train the neural network to increase robustness of the training. And some embodiments introduce fuzziness to the values such as transaction values, geo-location values, time values, other factors implemented as inputs for the neural network, and the like, to increase the robustness of the training for the neural network. Introduction of fuzziness to a value in transaction data refers to a modification of the value in the transaction data where the modification typically changes the value by less than an order of magnitude.

After pretraining with transaction data from multiple customers or all customers, the neural network may be trained, or retrained, with sets of transactions from a specific customer. Similar to the pretraining with the sets of transactions from multiple customers, the pretraining with sets of transactions from the specific customer's purchase history may include transaction sequences that have different counts of transactions, one or more synthesized time series of randomly selected transactions, and fuzzy values from the customer's purchase history. Fuzzy values refer to values in transaction data that are modified so the values do not reflect the actual purchase information. Such changes to the values in transaction data typically do not exceed an order of magnitude. In several embodiments, a neural network is pretrained for each customer, so each customer advantageously has a neural network, specifically adapted to the purchasing habits of that specific customer, to monitor that specific customer's transactions for fraudulent transactions.

In many embodiments, a service on one or more servers may pretrain the neural networks with the multiple customers' transaction data and each specific customer's transaction data prior to operating the neural network in inference mode to detect fraudulent transactions for a customer.

Once the neural network launches and begins to monitor the transactions for the specific customer, the neural network may operate in inference mode for fraud detection and, in many embodiments, collect new, non-fraudulent transaction data as new training data. In other words, once the fraud detection logic circuitry confirms or verifies that a transaction is non-fraudulent, the fraud detection logic circuitry may train the neural network with the new transaction data, advantageously, teaching the neural network the contemporaneous purchasing habits of the specific customer to continuously improve the neural network's ability to detect non-fraudulent transactions for that specific customer.

In some embodiments, the fraud detection logic circuitry resides in a server environment, monitoring a specific customer's transactions for fraudulent transactions. In other embodiments, the fraud detection logic circuitry resides in a customer's device such as a smart phone, tablet, laptop, or a desktop computer environment, and monitors that customer's transactions for fraudulent transactions. In such embodiments, the customer's device may comprise fraud detection logic circuitry with the neural network. In many of these embodiments, the neural network is pretrained with sets of the multiple customers' transaction data as well as retrained with the specific customer's purchase history. In other embodiments, the customer's device may receive the neural network pretrained with the multiple customers' transactions and the customer's device may retrain the neural network with that customer's purchase history. In still other embodiments, the customer's device may receive the neural network untrained. The customer's device may then pretrain the neural network with the multiple customers' transactions and retrain the neural network with that customer's purchase history. In one embodiment, the neural network is only trained with that customer's purchase history.

Several embodiments comprise systems with multiple processor cores such as central servers, access points, and/or stations (STAs) such as modems, routers, switches, servers, workstations, netbooks, mobile devices (Laptop, Smart Phone, Tablet, and the like), sensors, meters, controls, instruments, monitors, home or office appliances, Internet of Things (IoT) gear (watches, glasses, headphones, and the like), and the like. In various embodiments, these devices relate to specific applications such as healthcare, home, commercial office and retail, security, and industrial automation and monitoring applications, as well as vehicle applications (automobiles, self-driving vehicles, airplanes, drones, and the like), and the like.

Figure 1A:
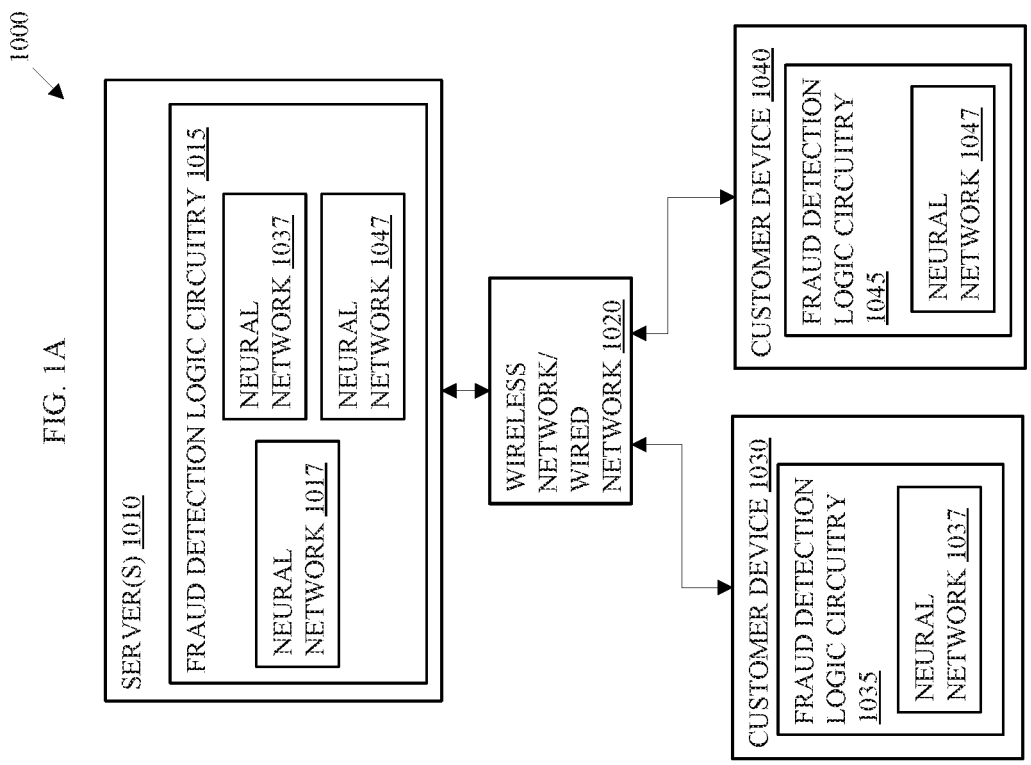

Turning now to the drawings, FIGS. 1A-B depict embodiments of systems including servers, networks, and customer devices to detect fraudulent transactions. FIG. 1A illustrates an embodiment of a system 1000. The system 1000 may represent a portion of at least one wireless or wired network 1020 that interconnects server(s) 1010 with customer devices 1030 and 1040. The at least one wireless or wired network 1020 may represent any type of network or communications medium that can interconnect the server(s) 1010 and the customer devices 1030 and 1040, such as a cellular service, a cellular data service, satellite service, other wireless communication networks, fiber optic services, other land-based services, and/or the like, along with supporting equipment such as hubs, routers, switches, amplifiers, and/or the like.

In the present embodiment, the server(s) 1010 may represent one or more servers owned and/or operated by a company that provides services. In some embodiments, the server(s) 1010 represent more than one company that provides services. For example, a first set of one or more server(s) 1010 may provide services including pretraining a neural network 1017 of a fraud detection logic circuitry 1015 with transaction data from more than one customer. The first set of server(s) 1010 may comprise anonymized transaction data that, in many embodiments, is known to comprise only or predominantly non-fraudulent transaction data. In some embodiments, the transaction data is not anonymized but the neural network 1017 may not require transaction data that would identify a particular customer.

The first set of server(s) 1010 may pretrain the neural network 1017 to detect, classify, and/or predict non-fraudulent transactions by training the neural network 1017 with sets of transactions from multiple customers. Each set of transactions may comprise a sequence of transactions that occur in a series such as a time series or time sequence.

After pretraining the neural network 1017 with the transaction data from multiple customers, the first set of the server(s) 1010 or a second set of one or more server(s) 1010 may continue to train or retrain one or more instances of the neural network 1017 with purchase history of one or more customers. For example, some embodiments fully train the neural network 1017 with the transaction data from multiple customers prior to training an instance of the neural network 1017 with purchase history of a specific customer. Other embodiments may not fully train the neural network 1017 prior to provision of an instance to train with purchase history of a specific customer. Note that fully training a neural network such as the neural network 1017 may involve training the neural network 1017 with sufficient samples of training data for the neural network 1017 to converge on solutions for, e.g., multiple predicted transactions or multiple classifications based on different initial conditions or initial states of the neural network 1017.

The neural networks 1037 and 1047 represent instances of the neural network 1017 retrained for customers associated with the customer devices 1030 and 1040, respectively. In several embodiments, one or more the server(s) 1010 may perform fraud detection with the neural networks 1037 and 1047. For example, the when the customer associated with the customer device 1030 completes a transaction such as purchasing gas, the fraud detection logic circuitry 1015 may apply transaction data that describes the purchase as a tensor to the input layer of the neural network 1037. The neural network 1037 may operate in inference mode and output an indication of error associated with the purchase. The error may represent a difference between the purchase of the gas and a predicted range of transactions that the neural network 1037 determines based on the pretraining and/or the continued training with new transactions for this customer. If the customer buys the gas at the same gas station for about the same amount, at about the same time, on about the same day of the week that the customer normally purchases gas for a vehicle, the error output from the neural network 1037 will likely be very small if not nil. On the other hand, if one or more of these factors deviate significantly from the customer's purchase history and/or from the sequences of transactions learned from training on transaction data from multiple customers, the error output from the neural network 1037 may be large.

Preferences by a company associated with the transactions, a company associated with the server(s) 1010 (if different), and/or the customer associated with the neural network 1037 may establish or factor into a determination of a deviation threshold. The fraud detection logic circuitry 1015 may compare the deviation threshold to the error output by the neural network 1037 in response to the purchase to determine if the error represents a potentially fraudulent transaction or is a non-fraudulent transaction.

For potentially fraudulent transactions, the fraud detection logic circuitry 1015 may generate a notification including transaction data indicative of the purchase such as the location of the purchase, the value of the purchase, the type of purchase, the vendor with whom the purchase was transacted, and/or the like, and request that customer confirm the purchase was non-fraudulent or that the purchase was fraudulent.

In many embodiments, the fraud detection logic circuitry 1015 may continue to collect training data and train the neural network 1037 based on customer transactions associated with the customer device 1030. Similarly, the fraud detection logic circuitry 1015 may continue to collect training data and train the neural network 1047 based on customer transactions associated with the customer device 1040. For example, the fraud detection logic circuitry 1015 may collect transaction data from new transactions associated with the customer device 1030, verify that the new transactions that are non-fraudulent, and then train the neural network 1037 based on the new transactions. The fraud detection logic circuitry 1015 may also collect new transaction data for the customer associated with customer device 1040, verify that that transactions are non-fraudulent, and continue to train the neural network 1047.

In other embodiments, the server(s) 1010 may pretrain the neural network 1017 with sets of transaction data from multiple customers and pretrain instances of the neural network 1017 such as the neural networks 1037 and 1047 with purchase histories of specific customers. Thereafter, the server(s) 1010 may transmit the neural network 1037 to the customer device 1030 and the neural network 1047 to the customer device 1040. In such embodiments, the fraud detection logic circuitry 1035 may perform fraud detection for transactions by the customer associated with the customer device 1030 and the fraud detection logic circuitry 1045 may perform fraud detection for transactions by the customer associated with the customer device 1040. In further embodiments, the fraud detection logic circuitry 1035 may verify that new transactions are non-fraudulent, add the new, non-fraudulent transactions to training data, and train the neural network 1037 with the new transaction data. Similarly, the fraud detection logic circuitry 1045 may verify that new transactions are non-fraudulent, add the new, non-fraudulent transactions to training data, and train the neural network 1047 with the new transaction data.

FIG. 1B depicts an embodiment for an apparatus 1100 such as one of the server(s) 1010, the customer device 1030, and/or the customer device 1040 shown in FIG. 1A. The apparatus 1100 may be a computer in the form of a smart phone, a tablet, a notebook, a desktop computer, a workstation, or a server. The apparatus 1100 can combine with any suitable embodiment of the systems, devices, and methods disclosed herein. The apparatus 1100 can include processor(s) 1110, a non-transitory storage medium 1120, communication interface 1130, and a display 1135. The processor(s) 1110 may comprise one or more processors, such as a programmable processor (e.g., a central processing unit (CPU)). The processor(s) 1110 may comprise processing circuitry to implement fraud detection logic circuitry 1115 such as the fraud detection logic circuitry 1015, 1035, or 1045 in FIG. 1A.

The processor(s) 1110 may operatively couple with a non-transitory storage medium 1120. The non-transitory storage medium 1120 may store logic, code, and/or program instructions executable by the processor(s) 1110 for performing one or more instructions including the fraud detection logic circuitry 1125. The non-transitory storage medium 1120 may comprise one or more memory units (e.g., removable media or external storage such as a secure digital (SD) card, random-access memory (RAM), a flash drive, a hard drive, and/or the like). The memory units of the non-transitory storage medium 1120 can store logic, code and/or program instructions executable by the processor(s) 1110 to perform any suitable embodiment of the methods described herein. For example, the processor(s) 1110 may execute instructions such as instructions of fraud logic circuitry 1125 causing one or more processors of the processor(s) 1110 represented by the fraud detection logic circuitry 1115 to perform an inference computation, by a neural network of the fraud detection logic circuitry 1115 based on transaction data. The inference computation may determine a deviation of the purchase from a range of purchases predicted for a customer based on pretraining of the neural network to predict purchases by the customer. The pretraining of the neural network to predict purchases by the customer may be based on a purchase history of that customer.

Once the neural network determines the deviation, the fraud detection logic circuitry 1115 may determine whether the deviation of the transaction from the range of purchases predicted by the customer exceeds a deviation threshold. The deviation threshold may represent an error threshold chosen, calculated, or otherwise determined to indicate an amount of error that raises a concern that the transaction may be fraudulent. In response to a determination that the deviation of the transaction exceeds the deviation threshold, the fraud detection logic circuitry 1115 may cause a message to display on a display device. The message may identify the transaction to the customer with pertinent transaction data such as location information and value information. The message may also identify the transaction as outside the range of purchases predicted by the neural network of the fraud detection logic circuitry 1115 and request that a customer respond with an indication about whether the transaction is fraudulent or not.

The memory units may comprise shared memory to store inputs and outputs of layers of the neural network for computation of the deviation, or error, by the processor(s) 1110. In some embodiments, the memory units of the non-transitory storage medium 1120 may store the processing results produced by the processor(s) 1104.

The processor(s) 1110 may couple to a communication interface 1130 to transmit and/or receive data from one or more external devices (e.g., a terminal, display device, a smart phone, a tablet, a server, or other remote device). The communication interface 1130 includes circuitry to transmit and receive communications through a wired and/or wireless media such as an Ethernet interface, a wireless fidelity (Wi-Fi) interface, a cellular data interface, and/or the like. In some embodiments, the communication interface 1130 may implement logic such as code in a baseband processor to interact with a physical layer device to transmit and receive wireless communications such as transaction data from a server or an instance of a neural network of the fraud detection logic circuitry 1115 and 1125. For example, the communication interface 1130 may implement one or more of local area networks (LAN), wide area networks (WAN), infrared, radio, Wi-Fi, point-to-point (P2P) networks, telecommunication networks, cloud communication, and the like.

In further embodiments, the fraud detection logic circuitry 1115 may also determine whether the transaction data is associated with a fraudulent location or blacklisted transaction data. In response to a determination that the transaction data is associated with a fraudulent location or blacklisted transaction data, a determination that the deviation exceeds the deviation threshold, or a weighted determination based on a combination of thereof, generate a communication for the customer, the communication to identify the transaction. For instance, the fraud detection logic circuitry 1115 may compare the transaction data such as a location value in the transaction data to blacklisted transaction data such as a location value on a list of locations or points of sale that have a history including one or more fraudulent transactions.

The processor(s) 1110 may couple to a display 1130 to display a message or notification via, graphics, video, text, and/or the like. In some embodiments, the display 1130 may comprise a display on a terminal, a display device, a smart phone, a tablet, a server, or a remote device.

Figure 1D:
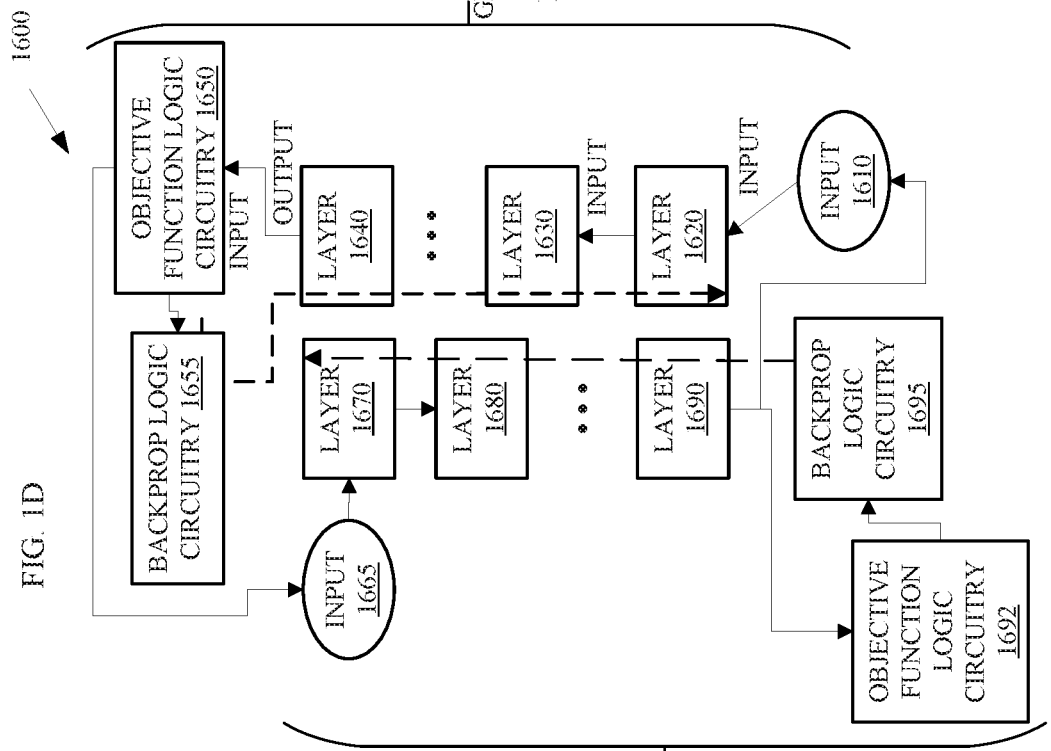
FIGS. 1C-D depict embodiments of a neural network of a fraud detection logic circuitry, such as fraud detection logic circuitry illustrated in FIGS. 1A-1B.
Figure 1C:
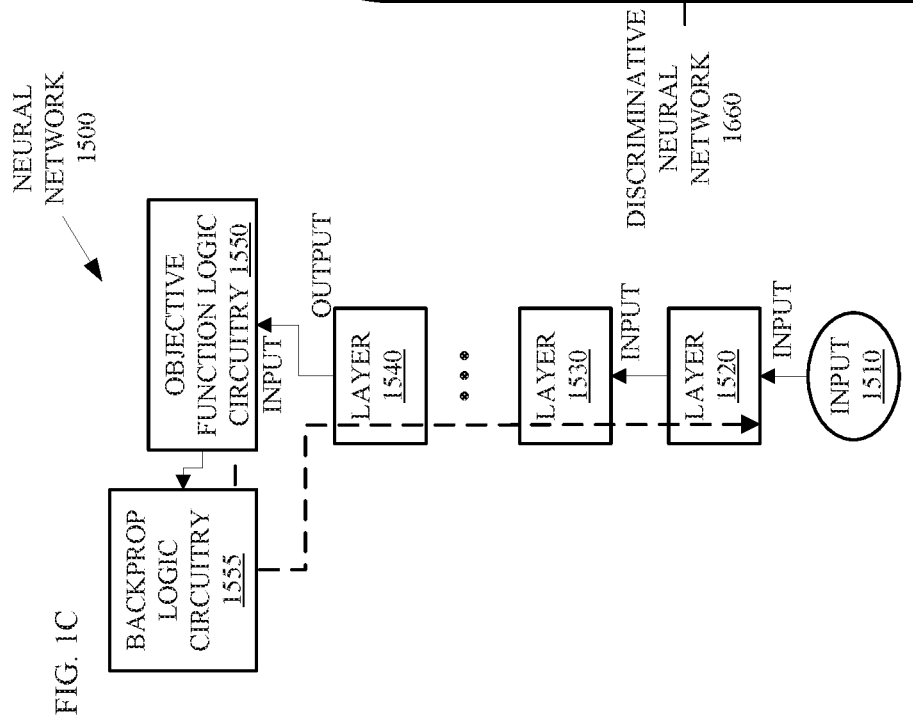

FIGS. 1C-D depict embodiments of a neural network 1500 of a fraud detection logic circuitry, such as fraud detection logic circuitry 1015, 1035, and 1045 illustrated in FIG. 1A and the fraud detection logic circuitry 1115 and 1125 illustrated in FIG. 1B. FIG. 1C depicts an embodiment of stages of a neural network (NN) 1500 such as a recurrent neural network (RNN).

An RNN is a class of artificial neural network where connections between nodes form a directed graph along a sequence. This allows the RNN to exhibit dynamic temporal behavior for a time sequence. RNNs can use their internal state (memory) to process sequences of inputs and can have a finite impulse structure or an infinite impulse structure. A finite impulse recurrent network is a directed acyclic graph that can be unrolled and replaced with a strictly feedforward neural network, while an infinite impulse recurrent network is a directed cyclic graph that cannot be unrolled. A feedforward neural network is a neural network in which the output of each layer is the input of a subsequent layer in the neural network rather than having a recursive loop at each layer.

The neural network 1500 comprises an input layer 1510, and three or more layers 1520 and 1530 through 1540. The input layer 1510 may comprise input data that is training data for the neural network 1500 or new transaction data to evaluate. The input layer 1510 may provide the transaction data in the form of tensor data to the layer 1520. The transaction data may comprise transaction information, which is data related to a purchase by a customer. The transaction data may include location information, value information, transaction type information, time information, and/or the like. For instance, the location information may include coordinates, a distance from an address associated with a customer, an address, a city, a state, a zip code, a map quadrant, and/or the like. The value information may include a purchase price, a value on hold, a sub-total, a tax, and/or the like. The transaction type information may include an indication of a general type and/or subtype of purchase such as a retail purchase, a gas purchase, a vehicle maintenance fee, a travel expense, a tax, a government fee, and/or the like. And the time information may include a time, a day, a month, a year, a season, a quarter, and/or the like.

In many embodiments, the input layer 1510 is not modified by backpropagation. The layer 1520 may compute an output and pass the output to the layer 1530. Layer 1530 may determine an output based on the input from layer 1520 and pass the output to the next layer and so on until the layer 1540 receives the output of the second to last layer in the neural network 1500.

The layer 1540 may generate an output and pass the output to an objective function logic circuitry 1550. The objective function logic circuitry 1550 may determine errors in the output from the layer 1540 based on an objective function such as a comparison of the expected output against the actual output. For instance, the expected output may be paired with the input in the training data supplied for the neural network 1500 for supervised training. In the present embodiment, during training, the output of the objective function logic circuitry 1550 should be less than a deviation threshold because the training data is known to represent non-fraudulent transactions. When operating in inference mode, the fraud detection logic circuitry, such as the fraud detection logic circuitry 1115 shown in FIG. 1B, may compare the output of the objective function logic circuitry 1550 against the deviation threshold to determine if the error indicates a potentially fraudulent transaction or a non-fraudulent transaction.

During the training mode, the objective function logic circuitry 1550 may output errors to backpropagation logic circuitry 1555 to backpropagate the errors through the neural network 1500. For instance, the objective function logic circuitry 1550 may output the errors in the form of a gradient of the objective function with respect to the parameters of the neural network 1500.

The backpropagation logic circuitry 1555 may propagate the gradient of the objective function from the top-most layer, layer 1540, to the bottom-most layer, layer 1520 using the chain rule. The chain rule is a formula for computing the derivative of the composition of two or more functions. That is, if f and g are functions, then the chain rule expresses the derivative of their composition f°g (the function which maps x to f(g(x))) in terms of the derivatives of f and g. After the objective function logic circuitry 1550 computes the errors, backpropagation logic circuitry 1555 backpropagates the errors. The backpropagation is illustrated with the dashed arrows.

FIG. 1D depicts an embodiment of stages of a neural network 1600 such as a generative adversarial network (GAN) or a recurrent generative adversarial network (RGAN). A generative adversarial network (GAN) is a framework for estimating generative models via an adversarial process, in which two models simultaneously train: a generative neural network 1605 that captures transaction data distribution and a discriminative neural network 1660 that estimates the probability that a sample came from the training data rather than the generative neural network 1605. The training procedure for the generative neural network 1605 is to maximize the probability of the discriminative neural network 1660 making a mistake. This framework corresponds to a minimax two-player game. In the space of arbitrary functions and the discriminative neural network 1660, a unique solution exists, with the generative neural network 1605 recovering the training data distribution and the discriminative neural network 1660 equal to 0.5 everywhere. While the generative neural network 1605 and the discriminative neural network 1660 may comprise Long Short-Term Memory (LSTM) neural networks, convolutional neural networks (CNNs), multilayer perceptrons, or the like.

An LSTM is a basic deep learning model and capable of learning long-term dependencies. A LSTM internal unit is composed of a cell, an input gate, an output gate, and a forget gate. The LSTM internal units have a hidden state augmented with nonlinear mechanisms to allow the state to propagate without modification, be updated, or be reset, using simple learned gating functions.

A CNN is a class of deep, feed-forward artificial neural networks. A CNN may comprise of an input layer and an output layer, as well as multiple hidden layers. The hidden layers of a CNN typically consist of convolutional layers, pooling layers, fully connected layers, and normalization layers.

RGANs make use of recurrent neural networks (RNNs) in the generator and the discriminator. RGANs may train to generate real-valued time series data to predict the next step in a sequence.

The neural network 1600 includes an input layer 1610 to receive transaction data. The input layer 1610 may comprise input data that is training data to train the neural network 1600 or new transaction data to evaluate for fraud detection. In many embodiments, the input data is not modified by backpropagation. The layer 1620 may compute an output and pass the output of the layer 1620 to the input of layer 1630. Layer 1630 may determine an output based on the input from layer 1620 and pass the output to the next layer.

The layer 1640 may generate an output and pass the output to an objective function logic circuitry 1650. The objective function logic circuitry 1650 may determine errors in the output from the layer 1640 of the generative neural network 1605 based on an objective function and output the error to the input layer 1665 of the discriminative neural network 1660.

The objective function logic circuitry 1650 may output errors to backpropagation logic circuitry 1655 to backpropagate the errors through the generative neural network 1605. For instance, the objective function logic circuitry 1650 may output the errors in the form of a gradient of the objective function with respect to the parameters of the generative neural network 1605.

The backpropagation logic circuitry 1655 may propagate the gradient of the objective function from the top-most layer, layer 1640, to the bottom-most layer, layer 1620 using the chain rule. The backpropagation is illustrated with the dashed arrows.

The discriminative neural network 1660 may receive the error output by the generative neural network 1605 and attempt to maximize the error by synthesizing training data to provide to the input layer 1610. The layer 1670 may compute an output and pass the output of the layer 1670 to the input of layer 1680. Layer 1680 may determine an output based on the input from layer 1670 and pass the output to the next layer.

The layer 1690 may generate an output and pass the output to an objective function logic circuitry 1692 as well as to the input layer 1610 of the generative neural network 1605. The objective function logic circuitry 1692 may determine errors in the output from the layer 1690 of the discriminative neural network 1660 based on an objective function.

Figure 2:
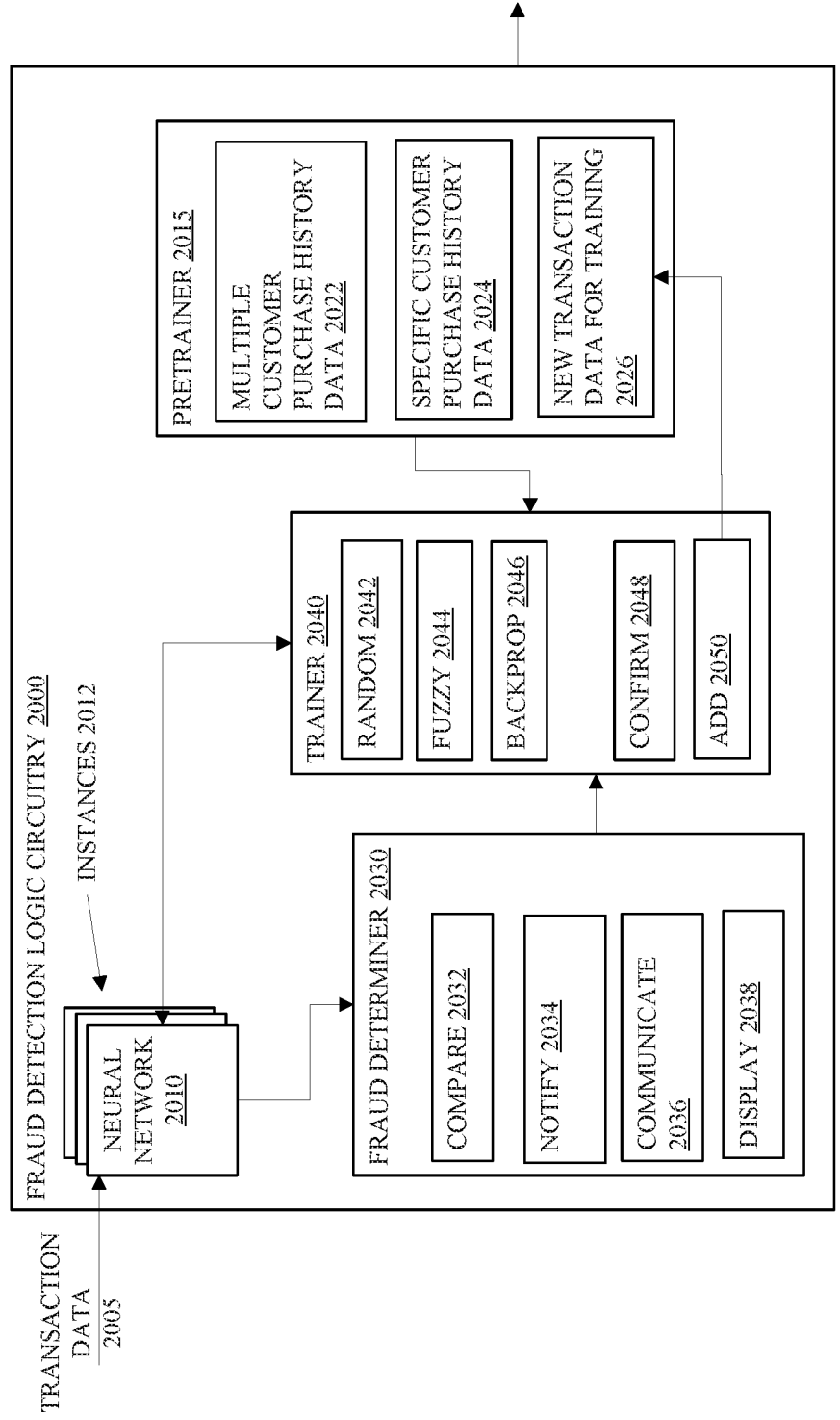
FIG. 2 depicts an embodiment of fraud detection logic circuitry, such as the fraud detection logic circuitry shown in FIGS. 1A-1B.

FIG. 2 depicts an embodiment of a fraud detection logic circuitry 2000 such as the fraud detection logic circuitry 1015 and/or 1035 in FIG. 1A. The fraud detection logic circuitry 2000 may perform one or more operations to train a neural network 2010, such as the neural networks 1500 and 1600 illustrated in FIGS. 1C-D, to detect fraud and to determine if a new transaction is non-fraudulent or is potentially a fraudulent transaction. The fraud detection logic circuitry 2000 may comprise logic circuitry such as the neural network 2010, a pretrainer 2015, a fraud determiner 2030, and a trainer 2040. The neural network 2010 may comprise one or more recurrent neural networks, a generative adversarial network, a recurrent generative adversarial network, and/or the like, to predict transactions for a customer based on pretraining with sets of transactions from a purchase history of the customer. The neural network 2010 may output a deviation or error to the fraud determiner 2030 in response to an input of transactions data 2005 or an input of training data from the pretraining 2015.

Prior to operation in inference mode, the fraud detection logic circuitry 2000 may operate the neural network 2010 in training mode and train the neural network 2010 with training data from the pretrainer 2015. The pretrainer 2015 may include multiple customer purchase history data 2022, specific customer purchase history data 2024, and new transaction data for training 2026. The multiple customer purchase history data 2022 may include transaction data from multiple customers. In some embodiments, the multiple customer purchase history data 2022 is anonymized and/or at least a portion of the data is encrypted. The anonymized data may include transaction data that does not have data to identify a customer and may even have modified transaction data that does not accurately indicate the transactions by the customer but reflect the transactions closely enough for training the neural network 2010.

In many embodiments, the fraud detection logic circuitry 2000 may first pretrain the neural network 2010 with the multiple customer purchase history data 2022. In other embodiments, the fraud detection logic circuitry 2000 may pretrain the neural network 2010 with synthesized transaction data.

The trainer 2040 may repeatedly select sets of transaction data from the multiple customer purchase history data 2022 for training. Each set may include a sequence or time series of transaction data from, e.g., a randomly selected customer and the sets may have different counts or numbers of transactions to, advantageously, increase the robustness of the training.

The trainer 2040 comprises logic circuitry to improve the training by occasionally or periodically modifying the transaction data from the pretrainer 2015. In the present embodiment, the trainer 2040 comprises random 2042 and fuzzy 2044. The random 2042 logic circuitry may form random sets of transactions from the multiple customer purchase history data 2022. For example, the random 2042 logic circuitry may randomly choose transactions from different customers to form a set of transactions as a sequence or time series. In some embodiments, the random selection of transactions may be limited by one or more rules such as a rule the prevents purchases within a short or unrealistic period of time, purchases within a specified time period, or multiple purchases of certain types within a specified time period. For instance, if a first purchase in a series is 20 miles from a second purchase and both are 'card present' purchases, a rule for the random logic may prevent the random selection of such purchases within a short or unrealistic period of time such as one minute. Note that the short or unrealistic period of time is defined in the context of the distance between the locations of the purchases.

The trainer 2040 may also comprise fuzzy 2044 logic circuitry. The fuzzy 2044 logic circuitry may modify values of the transaction data from the pretrainer 2015. For instance, the fuzzy 2044 logic circuitry may make small changes to locations of purchases such as moving the location across the street, values of transactions such as increasing or decreasing the value by 10% to 20%, modifying the time of the transaction, modifying the day of the transaction, and/or the like. Slight modifications to values of transaction data can, advantageously, improve the robustness of the neural network 2010. In several embodiments, the fuzzy 2044 logic circuitry may modify values occasionally or periodically. For instance, some embodiments may modify one value of one percent of the transactions received from the pretrainer 2015. Other embodiments may modify multiple values in five percent of the transactions. The frequency of such modifications may depend on design parameters of the neural network 2010.

A backprop 2046 logic circuitry of the trainer 2040 may train the neural network 2010 by backward propagation of the error that is output by the neural network 2010 in response to the training data. Backward propagation of the error may adjust weights and biases in the layers of the neural network to reduce the error. The backward propagation of the error may effectively adjust the range of predicted transactions responsive to the transaction data that caused the neural network to output the error.

After pretraining the neural network 2010 with the multiple customer purchase history data 2022, the fraud detection logic circuitry 2000 may create multiple instances 2012 of the neural network 2010. In some embodiments, the fraud detection logic circuitry 2000 may create one of the instances 2012 for every customer. In other embodiments, the fraud detection logic circuitry 2000 may create one of the instances 2012 for every customer within a group of customers. The fraud detection logic circuitry 2000 may select the group of customers based on various criteria, based on requests to "opt-in" from the group of customers, based on a list of customers provided to the fraud detection logic circuitry 2000, and/or based on other criteria.

The fraud detection logic circuitry 2000 may then retrain each of the instances 2012 of the neural network 2010 with specific customer purchase history data 2024. The specific customer purchase history data 2024 represents a set of the transaction data for a specific customer and there is a set for each customer, or at least each customer in the group of customers. In other words, an instance 2012 of the neural network 2010 is pretrained with the purchase history of a specific customer so that the fraud detection via the instance 2012 for a specific customer is, advantageously, based on that specific customer's purchase history.

In many embodiments, the retraining with the specific customer purchase history data 2024 may occur with sets of transactions that the trainer 2040 selects from the specific customer purchase history data 2024. The random 2042 logic circuitry may occasionally or periodically generate a set of random, non-fraudulent transactions in a time sequence or time series for training one of the instances 2012 of the neural network 2010. Furthermore, the fuzzy 2044 logic circuitry may adjust values of the transaction data from the specific customer purchase history data 2024. For instance, the fuzzy 2044 logic circuitry may change a price of a grocery bill or other transaction, the time of a dinner bill, or the like. In many embodiments, the change is not over an order of magnitude. Changing, e.g., the price by a small amount makes the transaction untraceable to the specific customer and can increase the robustness of the neural network 2010.

Once the fraud detection logic circuitry 2000 retrains one of the instances 2012 for a specific customer, the instance of the neural network 2010 can perform fraud detection for the specific customer and, in several embodiments, continue to train with new, non-fraudulent transactions completed by the customer. When the specific customer conducts a transaction, the vendor may transmit information related to that transaction to the payment instrument issuer. The payment instrument issuer may comprise a server to perform fraud detection based on the instance of the neural network 2010 that is trained for this specific customer or may hire a third party to perform the fraud detection. In either case, the fraud detection logic circuitry 2000 receives the transaction data 2005 as an input and provides the input to the instance of the neural network 2010 trained for the specific customer.

Based on the transaction data 2005, the instance of the neural network 2010 may perform fraud detection in inference mode and output an error or deviation to the fraud determiner 2030. The error or deviation may represent a difference between expected or predicted transaction data and transaction data 2005.

The fraud determiner 2030 may determine if the error or deviation output by the instance of the neural network 2010 pretrained for the specific customer indicates that the transaction is non-fraudulent or might be fraudulent. The fraud determiner 2030 may comprise logic circuitry to compare 2032 the error to a deviation threshold, notify 2034 the specific customer of the transaction associated with the transaction data 2005, communicate 2036 a message with a notification of the specific transaction to the specific customer and/or the payment instrument issuer, and display 2038 the notification to the specific customer. The compare 2032 logic circuitry may compare the error to a deviation threshold to determine if the error meets or exceeds the deviation threshold. If the error is equal to or greater than the deviation threshold, the compare 2032 logic circuitry may output an indication to the notify 2034 logic circuitry to indicate that the transaction data 2005 might be related to a fraudulent transaction.

Otherwise, the compare 2032 logic circuitry may determine the transaction data 2005 represents a non-fraudulent transaction and may instruct the trainer 2040 to add 2050 the transaction data 2005 to the new transaction data for training 2026. In many embodiments, the add 2050 logic circuitry may add the transaction data 2005 to the new transaction data for training 2026 after verification that the transaction data is non-fraudulent by the confirm 2048 logic circuitry. In such cases, confirm 2048 logic circuitry may wait for a period of time to receive an indication that the transaction data 2005 represents a fraudulent transaction and, if the indication is not received within that period of time, the add 2050 logic circuitry may add the transaction data 2005 to the new transaction data for training 2026. In other embodiments, the add 2050 logic circuitry may add the transaction data 2005 to the new transaction data for training 2026 upon determination that the error does not exceed the deviation threshold, along with an indication that the transaction data 2005 is not confirmed to be non-fraudulent. New transaction data for training 2026 that is not confirmed may not be unavailable for training purposes until the confirm 2048 logic circuitry changes the indication to indicate that the transaction data 2005 is verified as non-fraudulent. In still other embodiments, the add 2050 logic circuitry may add the transaction data 2005 to the new transaction data for training 2026 upon determination that the error does not exceed the deviation threshold.

In response to an indication that the transaction data 2005 might represent a fraudulent transaction, the notify 2034 logic circuitry may generate a message that includes a description of the transaction associated with the transaction data 2005. For embodiments in which the instance of the neural network 2010 operates on a server rather than a customer device, the communicate 2036 logic circuitry may cause the message to transmit to the specific customer. For example, the communicate 2036 logic circuitry may cause an email with the message or about the message to be transmitted to the specific customer, a text message with the message or about the message to be transmitted to the specific customer, a voice message with the message or about the message to communicated to the specific customer, and/or the like.

For embodiments in which the instance of the neural network 2010 operates on a customer device such as a smart phone, tablet, laptop, or other computer, the display 2038 logic circuitry may cause the message to display on a display of the customer device and/or provide an audible alarm or announcement.

Figure 3E:
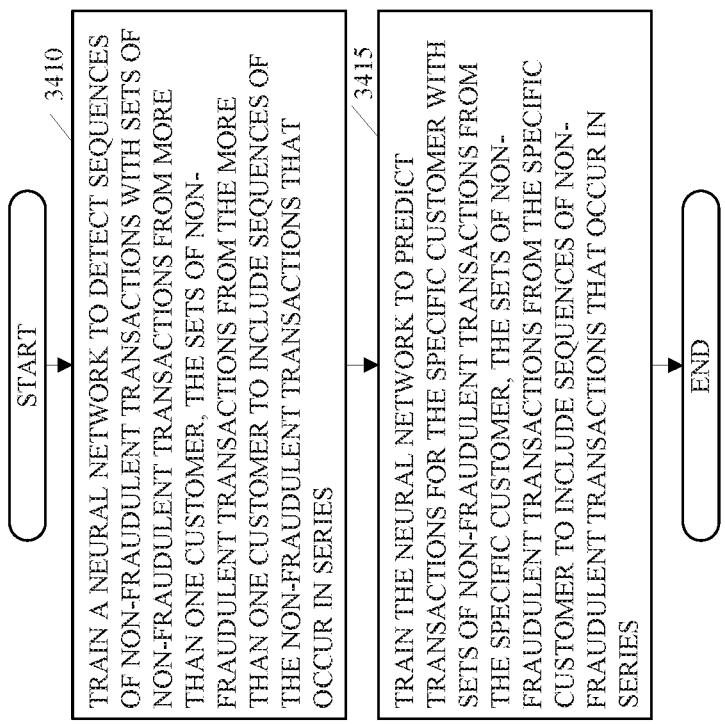

FIGS. 3A-E depict flowcharts of embodiments to pretrain a neural network, perform fraud detection with a neural network, and notify a consumer, by fraud detection logic circuitry, such as the fraud detection logic circuitry shown in FIGS. 1A-1B and 2. FIG. 3A illustrates a flowchart to pre-train a neural network and then pretrain or retrain the neural network again through transfer learning. The flowchart starts with pretraining the neural network based on purchase histories of multiple customers to train the neural network to recognize patterns of transactions (element 3010). In other words, the fraud detection logic circuitry may train the neural network based on multiple sets of a time series or sequence of transactions to teach the neural network common sequences of transactions. Many embodiments train the neural network on a server of the payment instrument issuer or a server by a third party to pretrain the neural network.

After pretraining the neural network based on the purchase histories of multiple customers, the flowchart may proceed to pretrain the neural network based on the purchase history of a specific customer to train the neural network to recognize patterns of transactions specific to the customer (element 3020). In several embodiments, the fraud detection logic circuitry may train an instance of the neural network on a server of the payment instrument issuer or a server by a third party to pretrain the neural network. In other embodiments, an instance of the neural network that is pretrained with multiple customers' transaction histories is communicated to a customer device so the customer device can perform retraining with that customer's purchase history.

FIG. 3B illustrates a flowchart for pretraining. The flowchart begins with repeatedly training the neural network based on different counts of transactions from the purchase history of the customer to generate the range of purchases predicted (element 3110). In other words, the fraud detection logic circuitry may retrain the neural network with multiple different sets of transactions from the purchase history of the customer and the multiple different sets will not all have the same number of transactions. Furthermore, a similar training can be applied to the multiple customer purchase histories.

FIG. 3C illustrates a flowchart for detecting a fraudulent transaction. The flowchart begins with receiving transaction data for a customer, the transaction data to describe a purchase made by the customer (element 3210). In response to receiving the transaction data, the fraud detection logic circuitry may perform an inference computation, by a neural network based on the transaction data. The neural network may determine a deviation of the purchase from a range of purchases predicted for the customer, wherein the neural network is pretrained to predict purchases by the customer based on a purchase history of the customer (element 3215). The deviation may comprise an error that the fraud detection logic circuitry may compare against a deviation threshold to determine if the deviation is indicative of a fraudulent transaction. If the deviation exceeds the deviation threshold, the fraud detection logic circuitry may determine that the transaction might be fraudulent (element 3220).

In response to determining that the transaction might be fraudulent, the fraud detection logic circuitry may cause a message to display on a display device. The message may identify the transaction as outside the range of purchases predicted by the neural network (element 3225). In several embodiments, the display may comprise a display of a customer device such as the customer's cell phone, tablet, laptop, computer, smart television, or other display.

FIG. 3D illustrates a flowchart for notifying a customer about a potentially fraudulent transaction. In response to determining that the transaction might be fraudulent, the fraud detection logic circuitry may display the communication on a display of a mobile device associated with the customer, wherein the processor comprises part of the mobile device (element 3310). For instances of neural networks executing on a customer device such as a mobile device, the fraud detection logic circuitry may display a message on the display of the mobile device to inform the customer about the potentially fraudulent transaction and to request verification that the transaction is fraudulent or is non-fraudulent.

FIG. 3E illustrates a flowchart for training a neural network to detect fraudulent transactions based on sequences of non-fraudulent transactions. The flowchart begins with training a neural network to detect sequences of non-fraudulent transactions with sets of non-fraudulent transactions from more than one customer. The sets of non-fraudulent transactions from the more than one customer may include sequences of the non-fraudulent transactions that occur in series (element 3410). In many embodiments, the sequences of the non-fraudulent transactions include subsets of sequences from the purchase histories of the more than one customer. In further embodiments, a random logic circuitry may select random transactions to synthesize one or more sequences for training the neural network.

After training the neural network to identify sequences of non-fraudulent transactions generally, the fraud detection logic circuitry may train the neural network to predict transactions for the specific customer with sets of non-fraudulent transactions from the specific customer. The sets of non-fraudulent transactions from the specific customer may include sequences of non-fraudulent transactions that occur in series (element 3415). Training with the sets of transactions from the specific customer for which the neural network will detect fraudulent transactions trains the neural network to predict sequences of transactions that are similar to the habits of the customer.

Figure 4:
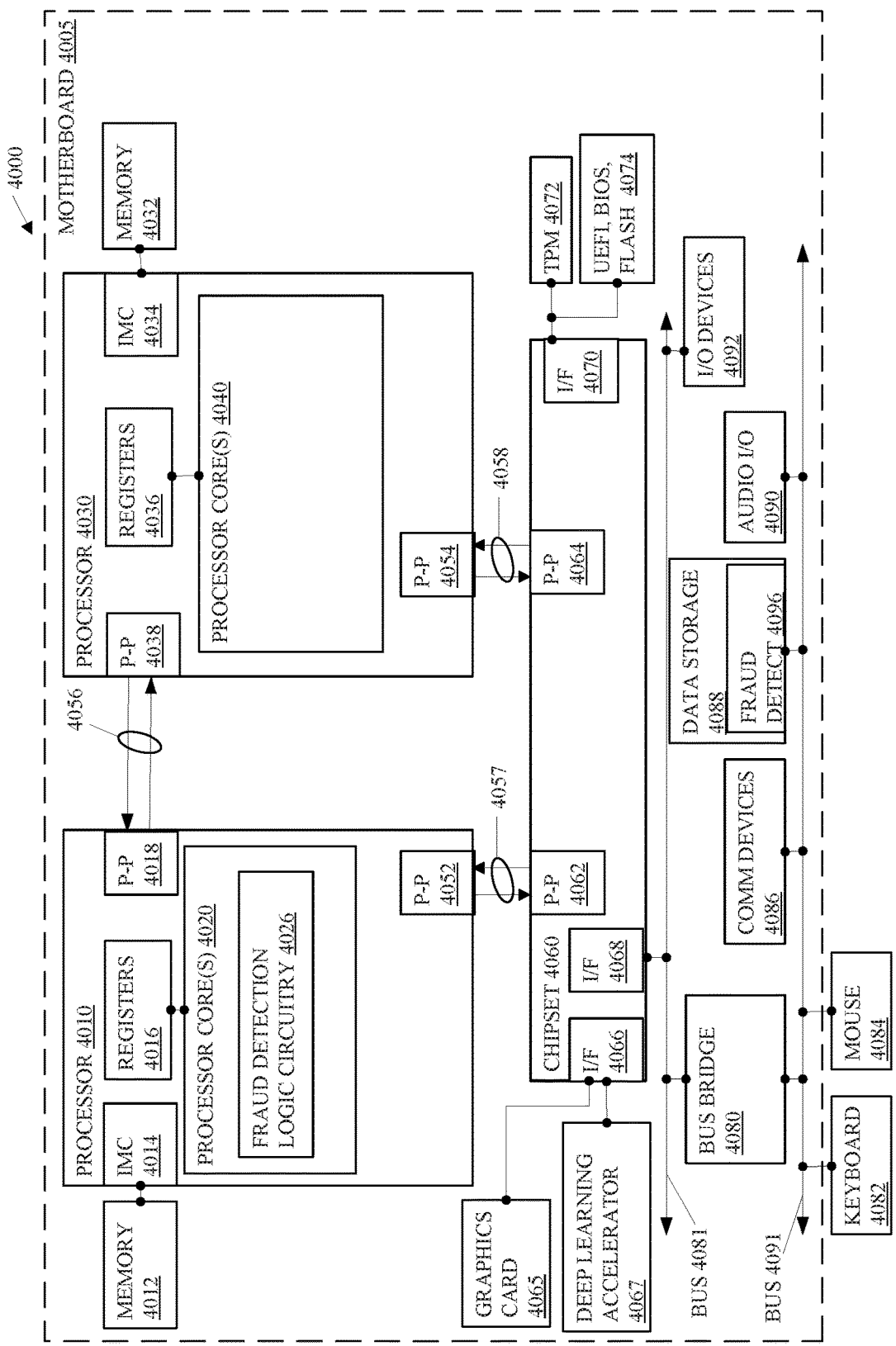
FIG. 4 depicts an embodiment of a system including a multiple-processor platform, a chipset, buses, and accessories such as the server shown in FIGS. 1A-1B.

FIG. 4 illustrates an embodiment of a system 4000. The system 4000 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 4000 may have a single processor with one core or more than one processor. Note that the term "processor" refers to a processor with a single core or a processor package with multiple processor cores.

As shown in FIG. 4, system 4000 comprises a motherboard 4005 for mounting platform components. The motherboard 4005 is a point-to-point interconnect platform that includes a first processor 4010 and a second processor 4030 coupled via a point-to-point interconnect 4056 such as an Ultra Path Interconnect (UPI). In other embodiments, the system 4000 may be of another bus architecture, such as a multi-drop bus. Furthermore, each of processors 4010 and 4030 may be processor packages with multiple processor cores including processor core(s) 4020 and 4040, respectively. While the system 4000 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 4010 and the chipset 4060. Some platforms may include additional components and some platforms may only include sockets to mount the processors and/or the chipset.

The first processor 4010 includes an integrated memory controller (IMC) 4014 and point-to-point (P-P) interconnects 4018 and 4052. Similarly, the second processor 4030 includes an IMC 4034 and P-P interconnects 4038 and 4054. The IMC's 4014 and 4034 couple the processors 4010 and 4030, respectively, to respective memories, a memory 4012 and a memory 4032. The memories 4012 and 4032 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 4012 and 4032 locally attach to the respective processors 4010 and 4030. In other embodiments, the main memory may couple with the processors via a bus and shared memory hub.

The processors 4010 and 4030 comprise caches coupled with each of the processor core(s) 4020 and 4040, respectively. In the present embodiment, the processor core(s) 4020 of the processor 4010 include a fraud detection logic circuitry 4026 such as the fraud detection logic circuitry 1022 shown in FIG. 1B. The fraud detection logic circuitry 4026 may represent circuitry configured to implement the functionality of fraud detection for neural network support within the processor core(s) 4020 or may represent a combination of the circuitry within a processor and a medium to store all or part of the functionality of the fraud detection logic circuitry 4026 in memory such as cache, the memory 4012, buffers, registers, and/or the like. In several embodiments, the functionality of the fraud detection logic circuitry 4026 resides in whole or in part as code in a memory such as the fraud detection logic circuitry 4096 in the data storage unit 4088 attached to the processor 4010 via a chipset 4060 such as the fraud detection logic circuitry 1125 shown in FIG. 1B. The functionality of the fraud detection logic circuitry 4026 may also reside in whole or in part in memory such as the memory 4012 and/or a cache of the processor. Furthermore, the functionality of the fraud detection logic circuitry 4026 may also reside in whole or in part as circuitry within the processor 4010 and may perform operations, e.g., within registers or buffers such as the registers 4016 within the processor 4010, or within an instruction pipeline of the processor 4010.

In other embodiments, more than one of the processor 4010 and 4030 may comprise functionality of the fraud detection logic circuitry 4026 such as the processor 4030 and/or the processor within the deep learning accelerator 4067 coupled with the chipset 4060 via an interface (I/F) 4066. The I/F 4066 may be, for example, a Peripheral Component Interconnect-enhanced (PCI-e).

The first processor 4010 couples to a chipset 4060 via P-P interconnects 4052 and 4062 and the second processor 4030 couples to a chipset 4060 via P-P interconnects 4054 and 4064. Direct Media Interfaces (DMIs) 4057 and 4058 may couple the P-P interconnects 4052 and 4062 and the P-P interconnects 4054 and 4064, respectively. The DMI may be a high-speed interconnect that facilitates, e.g., eight Giga Transfers per second (GT/s) such as DMI 3.0. In other embodiments, the processors 4010 and 4030 may interconnect via a bus.

The chipset 4060 may comprise a controller hub such as a platform controller hub (PCH). The chipset 4060 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 4060 may comprise more than one controller hub such as a chipset with a memory controller hub, a graphics controller hub, and an input/output (I/O) controller hub.

In the present embodiment, the chipset 4060 couples with a trusted platform module (TPM) 4072 and the unified extensible firmware interface (UEFI), BIOS, Flash component 4074 via an interface (I/F) 4070. The TPM 4072 is a dedicated microcontroller designed to secure hardware by integrating cryptographic keys into devices. The UEFI, BIOS, Flash component 4074 may provide pre-boot code.

Furthermore, chipset 4060 includes an I/F 4066 to couple chipset 4060 with a high-performance graphics engine, graphics card 4065. In other embodiments, the system 4000 may include a flexible display interface (FDI) between the processors 4010 and 4030 and the chipset 4060. The FDI interconnects a graphics processor core in a processor with the chipset 4060.

Various I/O devices 4092 couple to the bus 4081, along with a bus bridge 4080 which couples the bus 4081 to a second bus 4091 and an I/F 4068 that connects the bus 4081 with the chipset 4060. In one embodiment, the second bus 4091 may be a low pin count (LPC) bus. Various devices may couple to the second bus 4091 including, for example, a keyboard 4082, a mouse 4084, communication devices 4086 and a data storage unit 4088 that may store code such as the fraud detection logic circuitry 4096. Furthermore, an audio I/O 4090 may couple to second bus 4091. Many of the I/O devices 4092, communication devices 4086, and the data storage unit 4088 may reside on the motherboard 4005 while the keyboard 4082 and the mouse 4084 may be add-on peripherals. In other embodiments, some or all the I/O devices 4092, communication devices 4086, and the data storage unit 4088 are add-on peripherals and do not reside on the motherboard 4005.

Figure 5:
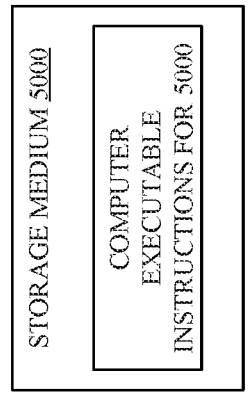
FIGS. 5-6 depict embodiments of a storage medium and a computing platform such as the server and the customer devices shown in FIGS. 1A-B.

FIG. 5 illustrates an example of a storage medium 5000 to store processor data structures. Storage medium 5000 may comprise an article of manufacture. In some examples, storage medium 5000 may include any non-transitory computer readable medium or machine readable medium, such as an optical, magnetic or semiconductor storage. Storage medium 5000 may store various types of computer executable instructions, such as instructions to implement logic flows and/or techniques described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 6:
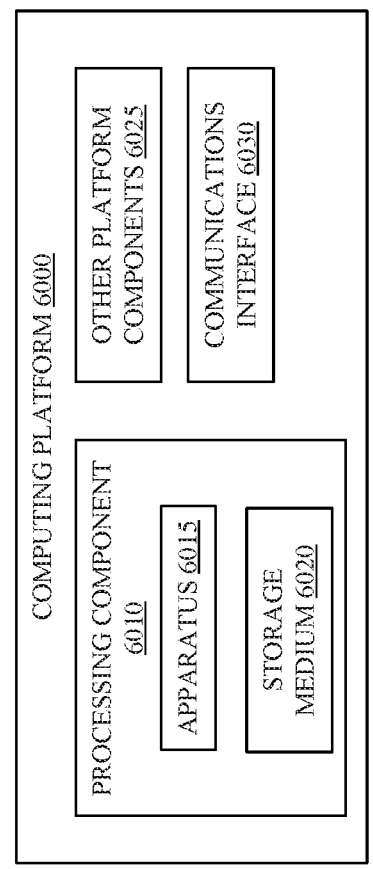

FIG. 6 illustrates an example computing platform 6000. In some examples, as shown in FIG. 6, computing platform 6000 may include a processing component 6010, other platform components or a communications interface 6030. According to some examples, computing platform 6000 may be implemented in a computing device such as a server in a system such as a data center or server farm that supports a manager or controller for managing configurable computing resources as mentioned above. Furthermore, the communications interface 6030 may comprise a wake-up radio (WUR) and may be capable of waking up a main radio of the computing platform 6000.

According to some examples, processing component 6010 may execute processing operations or logic for apparatus 6015 described herein such as the fraud detection logic circuitry 1115 illustrated in FIGS. 1A and 1B. Processing component 6010 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 6020, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 6025 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 6030 may include logic and/or features to support a communication interface. For these examples, communications interface 6030 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 6000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 6000 described herein, may be included or omitted in various embodiments of computing platform 6000, as suitably desired.

The components and features of computing platform 6000 may be implemented using any combination of discrete circuitry, ASICs, logic gates and/or single chip architectures. Further, the features of computing platform 6000 may be implemented using microcontrollers, programmable logic arrays and/or microprocessors or any combination of the foregoing where suitably appropriate. It is noted that hardware, firmware and/or software elements may be collectively or individually referred to herein as "logic".

It should be appreciated that the exemplary computing platform 6000 shown in the block diagram of FIG. 6 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores", may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and also implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

What is claimed is:

1. An apparatus comprising:
   memory; and
   logic circuitry coupled with the memory to:
      train a neural network based on purchase histories of multiple customers, the neural network trained to recognize patterns of transactions of the multiple customers;
      retrain the neural network pretrained with the purchase histories of the multiple customers to predict non-fraudulent purchases for a specific customer, wherein the neural network is retrained a plurality of times with sets of transactions specific to the customer based on a purchase history of the specific customer, and wherein each set of transactions includes a number of transactions selected based on one or more rules, and the one or more rules includes a rule to prevent multiple purchases of a particular type within a specified time to be included in a set of the sets of transactions used to retrain the neural network, and a particular type of transaction is based on whether a transaction card is present or not present to perform purchases;
      receive data about a transaction associated with the specific customer;

determine, by the neural network, a deviation of the transaction from predicted non-fraudulent purchases based on the data about the transaction;

compare the deviation of the transaction associated with the specific customer against a deviation threshold;

generate a notification in response to a determination that the deviation of the transaction from the predicted non-fraudulent purchases exceeds the deviation threshold, the notification to identify the transaction;

send the notification to a device associated with the specific customer; and train the neural network based on the transaction in response to the determination that the transaction is a fraudulent transaction.

2. The apparatus of claim 1, wherein the logic circuitry is configured to request a response from the specific customer, the response to indicate that the transaction is fraudulent or non-fraudulent.

3. The apparatus of claim 1, wherein the logic circuitry is configured to display the notification on a display of the device associated with the specific customer.

4. The apparatus of claim 1, wherein the purchase history of the specific customer comprises location information and value information.

5. The apparatus of claim 1, wherein the logic circuitry is configured to repeatedly retrain the neural network based on different counts of transactions randomly selected, based on the one or more rules, from the purchase history of the specific customer to predict the non-fraudulent purchases.

6. The apparatus of claim 1, wherein the logic circuitry is configured to retrain the neural network for the specific customer with the sets of transactions, wherein at least one set of the set of transactions comprises a time series of transactions.

7. The apparatus of claim 1, wherein the logic circuitry is configured to retrain the neural network for the specific customer with the sets of transactions, wherein at least one set comprises a synthesized sequence of transactions.

8. The apparatus of claim 1, wherein the one or more rules comprise a rule to prevent consecutive purchases within a specified time to be included in a set of transactions, and wherein the specified time is based on a distance between the consecutive purchases.

9. The apparatus of claim 1, the logic circuitry further configured when retraining the neural network at least once to: include, at least once, a backward propagation of an error based on a previous training of the neural network, wherein the backward propagation operates to adjust weights, biases, or combination thereof in layers of the retrained neural network to reduce the error.

10. The apparatus of claim 1, wherein each customer of the multiple customers is associated with an instance of the neural network, and wherein each customer of the multiple customers is selected based on requests to opt-in from other customers of the multiple customers.

11. A non-transitory storage medium containing instructions, which when executed by a processor, cause the processor to perform operations, the operations to:

train a neural network based on purchase histories of multiple customers, the neural network trained to recognize patterns of transactions of the multiple customers;

associate the neural network with a specific customer of the multiple customers;

retrain the neural network pretrained with the purchase histories of multiple customers to predict non-fraudulent purchases for the specific customer based on a purchase history of the specific customer, the neural network retrained a plurality of times with sets of transactions specific to the customer to recognize patterns of transactions of the specific customer and predict purchases associated with the specific customer, and wherein each set of transactions includes a number of transactions selected based on one or more rules, wherein the one or more rules comprise a rule to prevent multiple purchases of a particular type within a specified time to be included in a set of the sets of transactions used to retrain the neural network, and a particular type of transaction is based on whether a transaction card is present or not present to perform purchases;

receive transaction data, the transaction data to describe a purchase made associated with the specific customer;

perform an inference computation, by the neural network based on the transaction data, to determine a deviation of the purchase from predicted purchases, wherein the determination is based on the transaction data;

determine whether the deviation of the purchase from the predicted purchases for the specific customer exceeds a deviation threshold; and cause a message to display on a display device in response to a determination that the deviation of the purchase exceeds the deviation threshold, the message to identify the purchase as outside the predicted purchases predicted by the neural network.

12. The non-transitory storage medium of claim 11, wherein the operations further comprise operations to generate a communication for the specific customer, the communication to include information to identify the transaction for the specific customer and to request a response from the specific customer, the response to indicate that the transaction is a fraudulent transaction or is a non-fraudulent transaction.

13. The non-transitory storage medium of claim 11, wherein the operations further comprise operations to display the message on the display device of a mobile device associated with the specific customer, wherein the processor comprises part of the mobile device.

14. The non-transitory storage medium of claim 11, wherein the purchase history of the specific customer comprises location information and value information.

15. The non-transitory storage medium of claim 11, wherein the operations further comprise operations to repeatedly retrain the neural network based on different amounts of transactions from the purchase history of the specific customer to predict the purchases.

16. The non-transitory storage medium of claim 11, wherein the neural network comprises a recurrent neural network, a generative adversarial network, or a recurrent generative adversarial network.

17. The non-transitory storage medium of claim 11, wherein the operations further comprise operations to retrain the neural network for the specific customer with the sets of transactions, wherein at least one set comprises a time series of transactions.

18. The non-transitory storage medium of claim 11, wherein the operations further comprise operations to train the neural network for the specific customer with multiple sets of transactions and modify one or more values within at least one of the multiple sets.

19. A computer-implemented method, comprising:
- receiving, by a mobile device of a specific customer and from a server, a neural network trained by the server based on purchase histories of multiple customers, the neural network trained to recognize patterns of transactions of the multiple customers;
- retraining, by the mobile device of the specific customer, the neural network pretrained with the purchase histories of multiple customers to predict non-fraudulent purchases for the specific customer, wherein the neural network is retrained a plurality of times with sets of transactions specific to the customer based on a purchase history of the specific customer, and wherein each set of transactions includes a number of transactions selected based on one or more rules, wherein the one or more rules includes a rule to prevent multiple purchases of a particular type within a specified time to be included in a set of the sets of transactions used to retrain the neural network, and a particular type of transaction is based on whether a transaction card is present or not present to perform purchases;
- receiving, by the mobile device, data about a transaction associated with the specific customer;
- determining, by the neural network on the mobile device, a deviation of the transaction from the predicted non-fraudulent purchases based on the data about the transaction;
- comparing, by the mobile device, the deviation of the transaction associated with the specific customer against a deviation threshold;
- generating, by the mobile device, a notification in response to a determination that the deviation of the transaction from the predicted non-fraudulent purchases exceeds the deviation threshold, the notification to identify the transaction;
- presenting, on the mobile device, the notification to a device associated with the specific customer; and
- training, by the mobile device, the neural network based on the transaction in response to a determination that the transaction is a fraudulent transaction.

20. The computer-implemented method of claim 19, further comprising:
- repeatedly retrain the neural network based on different amounts of transactions from the purchase history of the specific customer to predict the purchases.

* * * * *